United States Patent [19]

Bedford

[11] Patent Number: 5,149,181
[45] Date of Patent: Sep. 22, 1992

[54] LENS WAFER, LAMINATE LENS AND METHOD OF FABRICATION THEREOF

[75] Inventor: Mark J. Bedford, Sonoma, Calif.

[73] Assignee: Pilkington Visioncare, Inc., Menlo Park, Calif.

[21] Appl. No.: 609,161

[22] Filed: Nov. 2, 1990

[51] Int. Cl.⁵ .......................... G02C 7/02; G02C 7/06
[52] U.S. Cl. .................................. 351/166; 351/172; 351/177
[58] Field of Search .......................... 351/166, 168-172, 351/177

[56] References Cited

U.S. PATENT DOCUMENTS

| | | | |
|---|---|---|---|
| 3,877,798 | 4/1974 | Tolar | 351/168 |
| 4,645,317 | 2/1987 | Freider et al. | 351/164 |
| 4,892,403 | 1/1990 | Merle | 351/168 |
| 4,969,729 | 11/1990 | Merle | 351/177 X |

Primary Examiner—Scott J. Sugarman
Attorney, Agent, or Firm—Harris Zimmerman

[57] ABSTRACT

Lens wafers which are bonded together with adhesive to form a laminate lens for use in eyeglasses or for other purposes enables immediate visual detection of the installation of an unlaminated lens wafer in the eyeglasses or the like. At least a portion of the safeguarded wafer has a visually observable region which impairs use of the wafer in the absence of the adhesive and another wafer. The impairment becomes invisible during the process of bonding the wafer to another wafer. The visually observable impairment may have an outline which conveys information such as optical parameters of the wafer or the angular position of the wafer relative to the other wafer at the start of the bonding process.

17 Claims, 2 Drawing Sheets

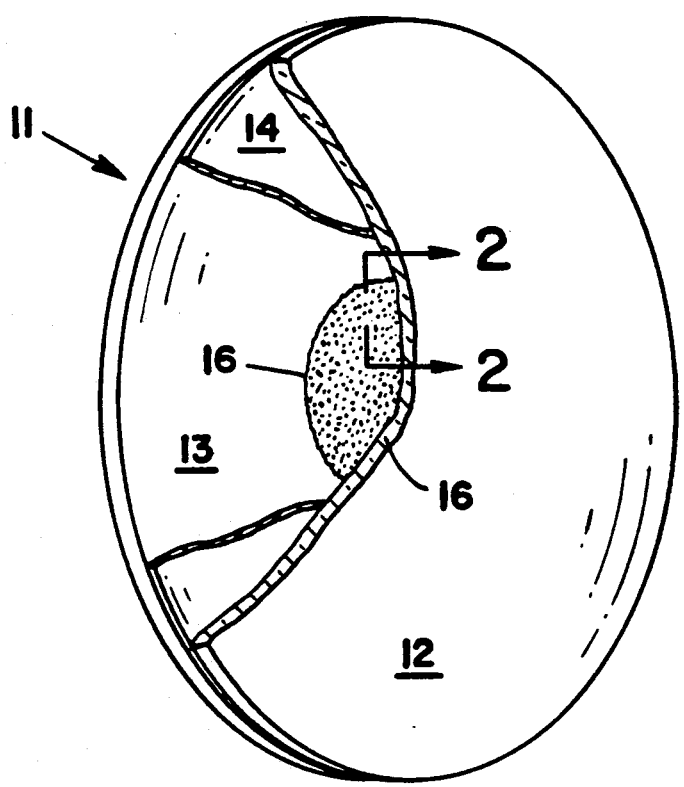
FIG_1
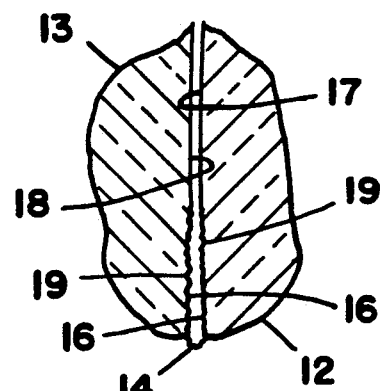
FIG_2
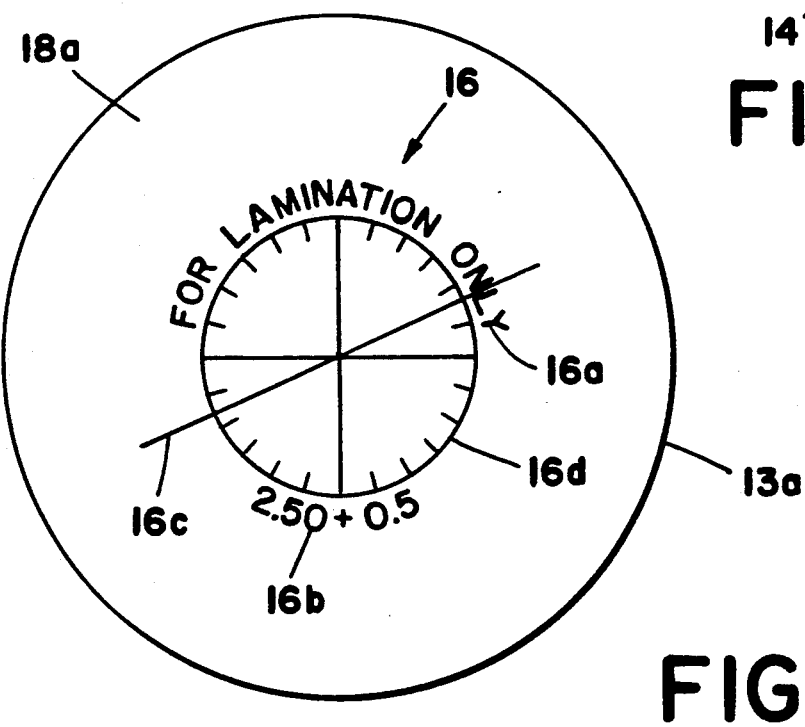
FIG_3

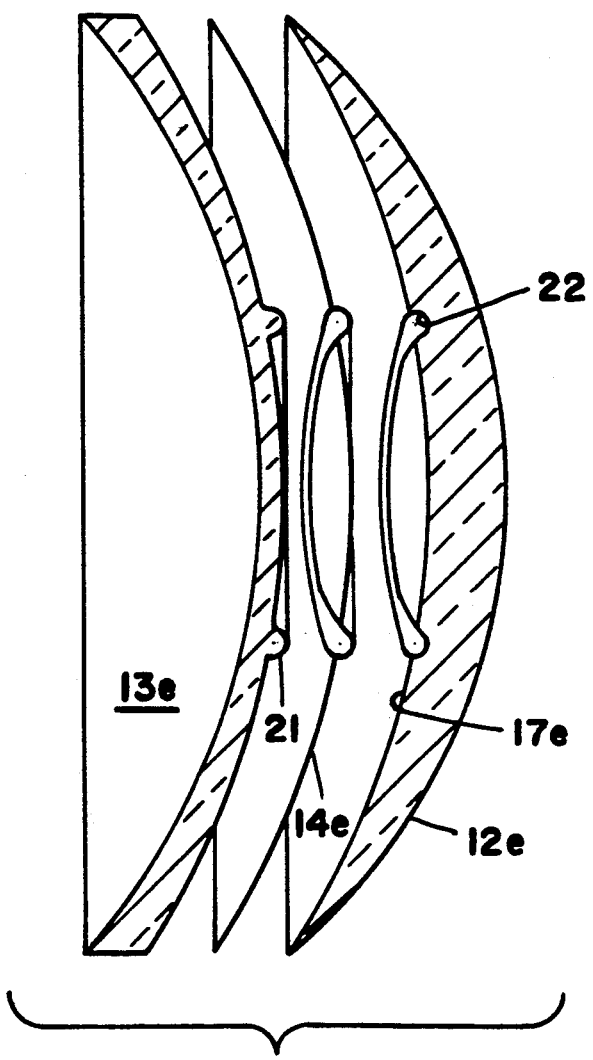
FIG_4
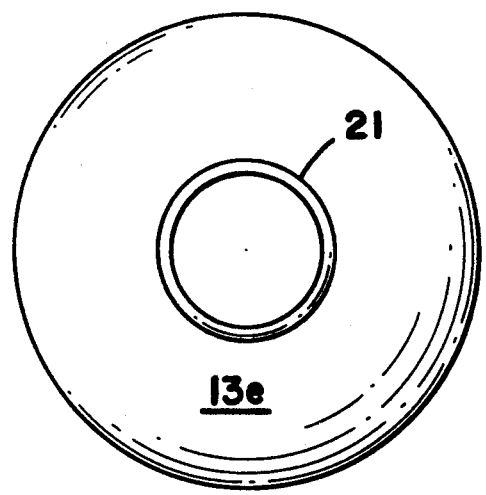
FIG_5

LENS WAFER, LAMINATE LENS AND METHOD OF FABRICATION THEREOF

TECHNICAL FIELD

This invention relates to optical lenses and more particularly to laminated lenses which are formed by bonding lens wafers together with transparent adhesive.

BACKGROUND OF THE INVENTION

Eyeglass prescriptions call for lenses having a specific combination of optical parameters that meets the needs of a particular person. The industry does not consider it to be practical to prefabricate a stock of lenses having every possible gradation of each parameter in every possible combination that may be needed. Consequently, a sizable proportion of eyeglass lenses are custom made at the facilities of dispensing opticians or optical laboratories.

Lenses have traditionally been formed as a single integral body of glass or plastic. Grinding or molding such lenses to meet the specifications of a particular prescription requires costly equipment, highly skilled technicians and is time consuming. It has been found that the fabrication of ophthalmic lenses can be economically accomplished in a more rapid manner with a laminated lens construction in which two lens wafers are bonded together with a transparent adhesive.

The laminate construction enables assembly of lenses having any of a large number of different combinations of optical parameters from a relatively small stock of prefabricated lens wafers of different configurations. Pairing of different combinations of the wafers can, for example, provide lenses having any of a large number of different powers as the power of the lens is the summation of the powers of the two wafers. Cylinder correction for astigmatism can be adjusted by an appropriate rotation of one wafer relative to the other prior to bonding of the wafers. Bifocal or multifocal wafers can be used when called for by the prescription and interlayers of light absorptive, light reflective or polarizing material can easily be provided between the wafers in the case of sunglasses or the like. Prior U.S. Pat. Nos. 3,877,798; 4,892,403 and 4,645,317 describe examples of the above discussed laminate lens fabrication techniques in more detail.

The fabrication of laminate lenses is subject to certain problems which have not heretofore been adequately addressed and resolved. There is a risk that eyeglasses may be inadvertently mis-assembled using an individual wafer itself rather than the bonded pair of wafers which constitute the desired laminate lens. The resulting eyeglasses may not provide the needed vision correction but this may not be apparent, at least immediately, to the person who receives and wears the eyeglasses. The individual lens wafer by itself may also be too thin to provide a desirable degree of impact strength.

The risk of such mis-assembly is enhanced where the simplicity of fabricating lenses by lamination techniques results in the work being performed by persons who lack the skills of a highly trained and experienced optical technician.

The present invention is directed to overcoming one or more of the problems discussed above.

SUMMARY OF THE INVENTION

In one aspect of the present invention, a light transmissive wafer for use in the fabrication of a laminated lens has at least one region which is formed to impair use of the wafer in the absence of the adhesive and second lens component. The region is visually observable in the unlaminated wafer but becomes invisible and ceases to impair use of the wafer when the wafer is bonded to the second lens component with the adhesive.

In another aspect of the invention, the use impairing region is ineradicable from the wafer except by operations that cause visually detectable damage to the wafer.

In another aspect of the invention, the visible use impairing region of the wafer has a configuration selected to convey predetermined information to a viewer of the wafer.

In another aspect of the invention, the use impairing region of the wafer includes at least a portion of the bonding surface that is deliberately formed with surface irregularities which become invisible when the surface is coated with a transparent adhesive having an index of refraction that is sufficiently close to the index of refraction of the wafer material.

In another aspect, the invention provides a first light transmissive wafer designed to be bonded to a second light transmissive wafer by transparent adhesive to form a laminated lens, the first wafer having a bonding surface for receiving adhesive and means for disrupting light transmission through at least a portion of the wafer. The light disrupting means is deactivated by bonding of the wafers together with adhesive.

In another aspect, the invention provides a laminated lens having at least first and second wafers with mating surfaces that are bonded by a layer of transparent adhesive. The mating surfaces of both wafers each have at least one visible surface discontinuity which impairs viewing of external objects through the wafer in the absence of the adhesive. The adhesive has an index of refraction sufficiently close to that of the wafers to cause the discontinuities to be invisible in the laminated lens whereby viewing of external objects through the lens is unimpaired after the wafers are bonded together by the adhesive.

In another aspect, the invention provides a method of fabricating a laminated lens by bonding at least a first and a second lens wafer together with transparent adhesive. Steps in the method include utilizing wafers having visually observable regions intentionally designed to impair viewing of external objects through the wafer in the absence of the adhesive. The regions are made invisible and the view impairment is eliminated by bonding the wafers together with the adhesive.

In still another aspect, a method of detecting the presence of an unlaminated lens wafer in a pair of eyeglasses includes the step of forming a visually observable region in the lens wafer which impairs viewing of external objects through the wafer in the absence of another wafer and a film of adhesive between the wafers.

The invention creates a visible indication that a single lens wafer has been provided in a pair of eyeglasses instead of a laminated lens. The defect is immediately apparent to the wearer of the glasses if for some reason it should be overlooked by the fabricator and/or fitter of the glasses. Thus the invention assures that dispensed eyeglasses provide the prescribed vision correction and have lenses with adequate impact strength. In the preferred forms of the invention, this safeguarding does not require any extra operations on the part of the fabricator of the lens. The visible view impairment inherently vanishes in the course of bonding two wafers together.

The invention, together with further aspects and advantages thereof, may be further understood by reference to the following description of preferred embodiments and by reference to the accompanying drawings.

BRIEF DESCRIPTION OF THE DRAWINGS

FIG. 1 is a partially broken out perspective view of a laminate lens embodying the invention.

FIG. 2 is an enlarged section view of a central portion of the laminate lens of FIG. 1 taken along line 2—2 thereof.

FIG. 3 is a rear view of a lens wafer in accordance with a further embodiment of the invention.

FIG. 4 is an exploded elevation section view of another laminate lens in accordance with a still another embodiment of the invention.

FIG. 5 is a front view of the rear lens wafer of the laminate lens of FIG. 4.

DETAILED DESCRIPTION OF THE PREFERRED EMBODIMENTS

Referring to FIG. 1 of the drawings, a laminate lens 11 is formed of a front lens wafer 12 bonded to a rear lens wafer 13 by an intervening thin layer of transparent adhesive 14 which may be one of the known commercially available optical cements. The lens wafers 12 and 13 are preferably molded of transparent plastic such as polycarbonates or methacrylates among others although the invention is also applicable to lenses 11 formed of glass wafers.

Except as herein described, the configurations of the lens wafers 12 and 13 may be similar to those of prior lens wafers that are used in the fabrication of laminated ophthalmic lenses as described, for example, in the previously identified prior United States patents. In keeping with prior practice in the art, a series of lens wafers 12 and 13 may be manufactured to provide different degrees of optical correction and to enable selection of a particular pair of front and rear lens wafers that jointly provide the corrections called for by a particular ophthalmic prescription. The wafers 12 and 13 may variously have configurations which provide a single vision lens 11 or may be configured to provide bifocal lenses, multi-focal lenses or lenses of progressively varying focal length in the vertical direction. One or both lens wafers 12 and 13 may be coated with light absorbent material, light reflective material or polarizing material in instances where sunglasses are to be fabricated.

The lens wafers 12 and 13 are distinct from prior wafers of this type in that each has at least one readily observable region 16 that impairs use of the wafer when it is in an unlaminated condition. The regions 16 become invisible and cease to impair use of the combined wafers 12 and 13 in a laminate lens 11 during the course of the lamination process as will hereinafter be described in more detail.

The use impairing regions 16 may be coextensive with the wafers 12, 13 or may occupy only portions of the wafers. In this embodiment, the regions 16 are circular areas located at the central portions of the wafers 12, 13. Such regions 16 may have any desired outline and a plurality of separate use impairing regions may be present as long the regions are readily apparent to a person inspecting the wafer 12, 13 and to a person attempting to view an external scene through the wafer.

Regions 16 do not necessarily have to have the same outline on the two wafers 12, 13 and it is not essential that they have the same location on both wafers. The regions 16 are preferably formed to be ineradicable from the wafers 12, 13 except by operations such as grinding, sandpapering or the like which will themselves leave marks that are visually detectable.

Referring jointly to FIGS. 1 and 2, the regions 16 in this embodiment are defined by roughened areas on the mating or bonding surfaces 17 and 18 of the wafers 12 and 13. Thus one such region 16 is formed on the concave back surface 17 of front wafer 12 and another region 16 is at the convex front surface 18 of the rear wafer 13.

The roughened areas 16 may be formed in any of several ways. If the wafers are of the molded variety, corresponding areas of the surfaces of the mold itself can be provided with minute projections and indentations by abrading, scratching, sandblasting or other similar techniques. Such projections and indentations 19 then appear at the corresponding locations on the molded wafers 12 and 13. This causes the regions 16 of the wafers to have the appearance of frosted glass as parallel light rays passing through such regions are refracted in diverse different directions by the minute projections and indentations 19.

Alternately, regions 16 may be roughened by etching. Other areas of the surfaces 17 and 18 which are not to be roughened are masked with a stencil or other material that is resistant to the etching solution while the regions 16 are being exposed to the solution. Hydrofluoric acid is a suitable etchant for most lens materials and is preferably used in the form of one of the semiviscous etching creams that are available commercially and which inhibit splashing.

Etching of the mating surfaces of lens wafers has heretofore been performed to provide for a stronger adhesive bond. The prior degree of etching is sufficient only to remove surface polish and areas etched in this manner are not visible to the naked eye. For the present purpose etching is prolonged until the etched area becomes clearly visible. The degree of etching past this point is not critical if the index of refraction of the adhesive 14 is the same as or very close to that of the wafer 12, 13 material. If the indices of refraction differ significantly, the etched region may start to become visible in the laminated lens 11 when the depth of etching reaches a point that is dependent on the disparity of the indices. For example, it has been found that in using an adhesive 14 having an index of refraction of 1.505 to bond etched wafers having an index of refraction of 1.499 etching should be terminated before indentations in the wafer surface reach a depth of 10 microns.

Bonding of lens wafers 12, 13 is usually performed by facing the concave surface 17 that is to be bonded upward. A drop of the uncured liquid adhesive 14 is then placed at the center of that surface 17. The convex surface 18 which is to be bonded is then rested upon the concave surface 17. Gravity induced pressure and capillary action then causes the adhesive 14 to spread outward to the periphery of the wafers. It has been found that the outward flow of the adhesive 14 becomes increasingly sensitive to surface roughness as it travels toward the periphery of the wafers 12, 13, presumably because the flow thins as it spreads outward. Significant obstruction of the outward flow by roughened areas at the peripheral region of the wafers 12, 13 does not occur in most cases but can be encountered if there is a high degree of roughening over an extensive area. In instances where this effect is found to cause problems, the regions 16 may be confined to the central portions of the wafers 12, 13.

View impairing roughened regions 16 can also be formed on the wafers 12, 13 by other techniques. Abrasion with emery paper or the like is one example. Sandblasting is another example but it has been found that this may require close matching of the indices of refraction of the adhesive 14 and wafers 12, 13 since the depth and uniformity of indentations produced by this procedure are hard to control.

The roughened regions 16 are visible in the absence of adhesive 14 since the indices of refraction of the wafer material 12, 13 is substantially different from that of air. Light rays passing from the roughened regions 16 into the adjacent atmosphere are strongly refracted in diverse different directions thereby disrupting any view of a coherent scene though such areas. The regions 16 become invisible after bonding of the two wafers 12, 13 with adhesive 14 as there is no longer a pronounced difference of index of refraction between the wafer material and the adjoining medium, adhesive 14. No refraction occurs as the light rays travel between the wafer material and the adhesive 14 if the indices of refraction of the two are identical. As a practical matter, the two indices of refraction need only be sufficiently close to each other to prevent a degree of refraction that is visually detectable to the naked eye. As discussed above, this degree of refraction is somewhat dependent on the degree of etching of the regions 16. The suitability of a particular adhesive 14 for a particular etched lens wafer 12, 13 can easily be determined by making a test lamination with the adhesive.

Referring to FIG. 3, the use impairing regions 16 on a particular wafer 13a may have outlines which convey information to optical technicians or others who examine the wafer. In this particular example, one such region 16a on wafer 13a consists of alphanumeric characters which advise the technician that the wafer is to be used for lamination only. Another such region 16b on the same wafer 13a may indicate optical parameters of the wafer. This particular wafer 13a is a toric rear wafer of the type that is rotated a prescribed amount relative to the front wafer during lens fabrication to correct an astigmatic vision defect. To facilitate this operation, another such region 16c is a line indicating the major axis of the toric wafer and still another such region 16d has the form of a circular scale. When the wafer 13a is to be bonded to a second wafer having similar markings, line 16c may be rotationally registered with the scale 16d of the other wafer at the angular location on the scale that corresponds with the prescribed degree of rotation.

Patterned use impairing regions such as 16a, 16b, 16c and 16d can readily be formed on the wafer 13a by known techniques such as by using etchant resistant stencils, photo resist masks or by applying an etchant resistant film to the wafer surface 18a and removing portions of it prior to etching. A particularly advantageous procedure is to apply a resist pattern to surface 18a which consists of water soluable ink applied by means of an ink jet printer. Following etching, both the etchant and the resist pattern can be washed away in one operation.

The use impairing regions 16 need not necessarily be frosted areas of the wafer surface as described above. Other forms of abrupt surface discontinuities in the mating surfaces of the lens wafers 13 will also create readily visible impairments to use of the wafer in an unlaminated condition that become undetectable to the naked eye after lamination.

For example, with reference jointly to FIGS. 4 and 5, one of the wafers 13e can be formed with one or more protrusions 21 which enter into one or more conforming indentations 22 formed in the mating surface 17e of the other wafer 12e. The protrusion 21 and indentation 22 may be annular and may be centered on the optical axis of the wafers 12e, 13e to enable rotation of one wafer relative to the other after nesting of the two wafers for the purposes which have been previously described.

If the protrusions 21 and indentations 22 are of sufficient size, refraction effects at those locations create a readily visible impairment to use of the lens wafers 12e, 13e in an unlaminated condition during fabrication of the laminated lens 11e, the adhesive layer 14e conforms itself to the protrusion 21 and indentation 22. The refraction effects then disappear and the presence of the protrusion 21 and indentation 22 is no longer detectable by the naked eye as light rays passing from one wafer 12e to the other 13e do not encounter any significant change of index of refraction.

The invention has been herein described with reference to the fabrication of opthalmic lenses for use in eyeglasses and is particularly advantageous in such operations for the previously given reasons. The invention is also applicable in the production of lens wafers and laminate lenses which are used for other purposes such as in telescopes, cameras or other optical instruments.

While the invention has been described with reference to certain specific embodiments for purposes of example, many other variations and modifications are possible and it is not intended to limit the invention except as defined in the following claims.

I claim:

1. In a light transmissive wafer for use in fabricating a laminated lens, said wafer having a bonding surface which is bonded to the surface of a second lens component by a transparent adhesive during fabrication of said lens, the improvement comprising:
    said wafer having at least one visually observable region at said bonding surface which is formed to impair use of the wafer in the absence of the adhesive and second lens component by disrupting light transmission through said region and which is visually distinguishable from other areas of said bonding surface prior to bonding of said wafer to said second lens component, which region becomes invisible and ceases to impair use of the wafer when the wafer is bonded to said second lens component with said adhesive.

2. The wafer of claim 1 wherein said use impairing region of said wafer includes a portion of said bonding surface that is formed with surface irregularities which cause said region to be visually distinguishable from said other areas of said bonding surface.

3. The wafer of claim 1 wherein said use impairing region of said wafer is defined at least in part by at least one outwardly extending projection on said bonding surface which projection is of sufficient size to be visible and to be visually distinguishable from said other areas of said bonding surface.

4. The wafer of claim 1 wherein said use impairing region of said wafer is defined at least in part by at least one indentation in said bonding surface which indentation is of sufficient size to be visible and to be visually distinguishable from said other areas of said bonding surface.

5. The wafer of claim 1 in combination with said second lens component, one of said wafer and said second lens component having a projection of sufficient size to be visible and to be visually distinguishable from said other areas of said bonding surface prior to bonding of said wafer and said lens component together and the other thereof having a conforming indentation in which said projection is received.

6. The wafer of claim 1 wherein said use impairing region includes an area of said bonding surface that is etched to a depth sufficient to make said area visible and to make said area visually distinguishable from said other areas of said wafer.

7. In a light transmissive wafer for use in fabricating a laminated lens, said wafer having a bonding surface which is bonded to the surface of a second lens component by a transparent adhesive during fabrication of said lens, the improvement comprising:

said wafer having at least one region which is formed to impair use of the wafer in the absence of the adhesive and second lens component which region becomes invisible and ceases to impair use of the wafer when the wafer is bonded to said second lens component with said adhesive, wherein said use impairing region of said wafer has a configuration selected to convey predetermined information to a viewer of said wafer.

8. In a light transmissive wafer for use in fabricating a laminated lens, said wafer having a bonding surface which is bonded to the surface of a second lens component by a transparent adhesive during fabrication of said lens, the improvement comprising:

said wafer having at least one region which is formed to impair use of the wafer in the absence of the adhesive and second lens component which region becomes invisible and ceases to impair use of the wafer when the wafer is bonded to said second lens component with said adhesive, wherein said wafer has a plurality of said use impairing regions which are spaced apart and positioned to indicate the angular orientation of said wafer relative to the angular orientation of said second lens component during fabrication of said lens.

9. In a light transmissive wafer for use in fabricating a laminated lens, said wafer having a bonding surface which is bonded to the surface of a second lens component by a transparent adhesive during fabrication of said lens, the improvement comprising:

said wafer having at least one region which is formed to impair use of the wafer in the absence of the adhesive and second lens component which region becomes invisible and ceases to impair use of the wafer when the wafer is bonded to said second lens component with said adhesive, wherein said wafer is toric optical element having a major axis and wherein at least a portion of said use impairing region is shaped to identify said major axis.

10. In a light transmissive wafer for use in fabricating a laminated lens, said wafer having a bonding surface which is bonded to the surface of a second lens component by a transparent adhesive during fabrication of said lens, the improvement comprising:

said wafer having at least one region which is formed to impair use of the wafer in the absence of the adhesive and second lens component which region becomes invisible and ceases to impair use of the wafer when the wafer is bonded to said second lens component with said adhesive, wherein said wafer has a plurality of said use impairing regions, said regions having the shape of alphanumeric characters which designate optical parameters of said wafer.

11. A first light transmissive wafer designed to be bonded to a second light transmissive wafer by a transparent adhesive to form a laminated lens, said first wafer having a body of transparent material with a bonding surface for receiving said adhesive and means for disrupting light transmission through at least a portion of said first wafer at said bonding surface to a degree that the disruption is visually apparent to a viewer of said first wafer which means is deactivated by bonding of said wafers together with said adhesive.

12. In a method of fabricating a laminated lens by bonding at least a first and a second lens wafer together with transparent adhesive, which wafers have mating surfaces between which said adhesive is situated, the steps comprising:

utilizing wafers which have visually observable regions intentionally designed to impair viewing of external objects through the wafer in the absence of said adhesive which regions disrupt light transmission through the wafers to a degree that the disruption is visually apparent to a viewer of the wafers, and rendering said regions invisible and eliminating said view impairment by bonding said wafers together with said adhesive.

13. The method of claim 12 including the further step of providing said view impairing regions in said wafers by forming surface irregularities in at least a portion of each of said mating surfaces including forming said irregularities to be of sufficient size to cause said visually apparent disruptions of light transmission, and utilizing an adhesive having an index of refraction which is substantially the same as that of said wafers to nullify the optical effects of said irregularities when said wafers are bonded together with said adhesive.

14. The method of claim 12 including the further step of forming said visually observable view impairing regions of said wafers with outlines selected to convey predetermined information concerning said wafers to persons who view said wafers prior to lamination of said wafers.

15. A method of preventing the dispensing of eyeglasses with an unlaminated lens wafer therein comprising the step of forming a visually observable region in said wafer at which light transmission is disrupted in a visually apparent manner and which impairs viewing of external objects through said wafer in the absence of a second lens wafer and a layer of adhesive between said wafers.

16. A light transmissive wafer for use in fabricating a laminated lens, said wafer having a bonding surface which is bonded to the bonding surface of a second wafer by a transparent adhesive during fabrication of a laminated lens which adhesive has a refractive index substantially the same as that of said wafer, wherein said wafer has at least one region which impairs the light transmission of the wafer in the absence of the transparent adhesive and another wafer, and that is visually distinguishable from adjacent areas of said wafer indicating clearly and easily that the wafer is not, or is not properly, bonded to another wafer, which region becomes undetectable and ceasing to impair use of the wafer when the wafer is bonded to another wafer with said transparent adhesive.

17. The light transmissive wafer of claim 16 wherein said light transmission impairing region is configured to convey information to a viewer of said wafer.

* * * * *